(12) United States Patent
Yamanaka (10) Patent No.: US 10,486,516 B2
(45) Date of Patent: Nov. 26, 2019

(54) BATTERY MOUNTING STRUCTURE (71) Applicant: TOYOTA JIDOSHA KABUSHIKI KAISHA, Toyota-shi, Aichi-ken (JP)

(72) Inventor: Atsushi Yamanaka, Nagoya (JP)

(73) Assignee: TOYOTA JIDOSHA KABUSHIKI KAISHA, Toyota-shi, Aichi-ken ( * ) Notice: Subject to any disclaimer, the term of this patent is extended or adjusted under 35 U.S.C. 154(b) by 0 days.

(21) Appl. No.: 15/989,664

(22) Filed: May 25, 2018

(65) Prior Publication Data
US 2018/0345778 A1 Dec. 6, 2018

(30) Foreign Application Priority Data

May 31, 2017 (JP) .................................. 2017-108535

(51) Int. Cl.
*B60K 1/04* (2019.01)
*B62D 21/02* (2006.01)

(52) U.S. Cl.
CPC ................ *B60K 1/04* (2013.01); *B62D 21/02* (2013.01); *B60K 2001/0438* (2013.01)

(58) Field of Classification Search
CPC ... B60K 1/04; B60K 2001/0438; B62D 21/02
See application file for complete search history.

(56) References Cited

U.S. PATENT DOCUMENTS

| | | | | |
|---|---|---|---|---|
| 7,896,115 B2* | 3/2011 | Ono | ........................ | B60K 1/04 180/65.31 |
| 8,286,743 B2* | 10/2012 | Rawlinson | .............. | F41H 7/042 180/68.5 |
| 8,393,427 B2* | 3/2013 | Rawlinson | .............. | F41H 7/042 180/68.5 |
| 8,459,399 B2* | 6/2013 | Ohashi | ..................... | B60K 1/04 180/312 |
| 8,702,161 B2* | 4/2014 | Charbonneau | ....... | B62D 21/157 296/187.12 |
| 8,833,499 B2* | 9/2014 | Rawlinson | .............. | F41H 7/042 180/68.5 |
| 8,875,828 B2* | 11/2014 | Rawlinson | ............... | B60K 1/04 180/68.5 |
| 8,932,769 B2* | 1/2015 | Ohashi | ................... | B62D 25/20 429/400 |
| 9,027,684 B2* | 5/2015 | Araki | ....................... | B60K 1/04 180/311 |

(Continued)

FOREIGN PATENT DOCUMENTS

| | | |
|---|---|---|
| DE | 102011001861 A1 | 10/2012 |
| DE | 102015000578 A1 | 7/2016 |

(Continued)

OTHER PUBLICATIONS

Communication issued by the European Patent Office dated Nov. 13, 2018 in counterpart application No. 18174499.6.

*Primary Examiner* — Jacob B Meyer
(74) *Attorney, Agent, or Firm* — Sughrue Mion, PLLC (57) ABSTRACT

A battery mounting structure for a vehicle, the battery mounting structure includes: a plurality of vehicle body frame members that is arrayed in a vehicle width direction of the vehicle and is part of a lower frame of a vehicle body; and a plurality of cell stacks that each include a plurality of single cells. Each of the cell stacks is configured to be restrained onto the vehicle body.

16 Claims, 10 Drawing Sheets

(56) References Cited

U.S. PATENT DOCUMENTS

| | | | |
|---|---|---|---|
| 9,045,030 B2* | 6/2015 | Rawlinson | B60K 1/04 |
| 9,118,094 B2* | 8/2015 | Tsujimura | H01M 2/1077 |
| 9,160,042 B2* | 10/2015 | Fujii | B60K 1/04 |
| 9,216,638 B2* | 12/2015 | Katayama | B60K 1/04 |
| 9,444,082 B2* | 9/2016 | Tsujimura | H01M 2/1077 |
| 9,758,029 B2* | 9/2017 | Hokazono | B60K 1/04 |
| 9,758,030 B2* | 9/2017 | Newman | B60L 50/64 |
| 9,761,851 B2* | 9/2017 | Onodera | H01M 2/1077 |
| 9,868,361 B2* | 1/2018 | Barbat | B60K 1/04 |
| 9,919,591 B2* | 3/2018 | Mizoguchi | B60K 1/04 |
| 9,937,818 B2* | 4/2018 | Newman | B60L 50/64 |
| 9,944,162 B2* | 4/2018 | Li | B60K 1/04 |
| 9,960,403 B2* | 5/2018 | Lee | H01M 2/30 |
| 9,988,093 B2* | 6/2018 | Pastrick | B62D 21/04 |
| 10,017,037 B2* | 7/2018 | Newman | B62D 25/20 |
| 10,023,038 B2* | 7/2018 | Rawlinson | B60K 1/04 |
| 10,062,877 B2* | 8/2018 | Lee | H01M 2/1077 |
| 10,099,546 B2* | 10/2018 | Hara | B60L 50/66 |
| 10,109,894 B2* | 10/2018 | Tsujimura | H01M 2/1072 |
| 10,112,470 B2* | 10/2018 | Hamilton | B60K 1/04 |
| 10,144,307 B2* | 12/2018 | Newman | B60L 50/64 |
| 10,158,113 B2* | 12/2018 | Fujii | H01M 2/206 |
| 10,160,344 B2* | 12/2018 | Newman | B60L 50/64 |
| 10,160,492 B2* | 12/2018 | Fees | B60K 1/04 |
| 10,207,574 B2* | 2/2019 | Ozawa | B60K 1/04 |
| 10,220,694 B2* | 3/2019 | Mizoguchi | B60K 1/04 |
| 10,220,882 B2* | 3/2019 | Ayukawa | B62D 21/155 |
| 10,232,697 B2* | 3/2019 | Hara | B60K 1/04 |
| 2007/0007060 A1* | 1/2007 | Ono | B60K 1/04 180/65.31 |
| 2011/0297467 A1 | 12/2011 | Isawa et al. | |
| 2011/0300427 A1 | 12/2011 | Isawa et al. | |
| 2012/0006607 A1* | 1/2012 | Ohashi | B60K 1/04 180/65.31 |
| 2012/0028135 A1* | 2/2012 | Ohashi | B62D 25/20 429/400 |
| 2012/0161472 A1 | 6/2012 | Rawlinson et al. | |
| 2013/0175829 A1 | 7/2013 | Kim et al. | |
| 2013/0327583 A1* | 12/2013 | Nitawaki | B60K 1/04 180/68.5 |
| 2014/0374180 A1 | 12/2014 | Katayama et al. | |
| 2014/0374181 A1* | 12/2014 | Karashima | B60K 1/04 180/68.5 |
| 2016/0347160 A1* | 12/2016 | Landgraf | B60K 1/04 |
| 2016/0375750 A1* | 12/2016 | Hokazono | B60K 1/04 180/68.5 |
| 2018/0127032 A1* | 5/2018 | Atsumi | B62D 21/157 |
| 2018/0337377 A1* | 11/2018 | Stephens | H01M 2/1083 |
| 2018/0345778 A1* | 12/2018 | Yamanaka | B60K 1/04 |
| 2018/0375075 A1* | 12/2018 | Yoshimura | H01M 2/02 |

FOREIGN PATENT DOCUMENTS

| | | |
|---|---|---|
| EP | 3345779 A1 | 7/2018 |
| JP | 2012-096789 A | 5/2012 |
| JP | 2012-131486 A | 7/2012 |
| JP | 2013-067381 A | 4/2013 |
| WO | 2010/098271 A1 | 9/2010 |
| WO | 2013044645 A1 | 4/2013 |
| WO | 2018071762 A1 | 4/2018 |

* cited by examiner

RELATED ART

FIG. 9

RELATED ART

FIG. 10

BATTERY MOUNTING STRUCTURE

INCORPORATION BY REFERENCE

The disclosure of Japanese Patent Application No. 2017-108535 filed on May 31, 2017 including the specification, drawings and abstract is incorporated herein by reference in its entirety.

BACKGROUND

1. Technical Field

The present disclosure relates to a battery mounting structure that is employed to mount a plurality of cell stacks in a lower part of a vehicle body.

2. Description of Related Art

In the electric vehicle described in Japanese Patent Application Publication No. 2012-96789, a large-sized battery unit including a battery case is mounted between left and right side members provided in a lower part of a vehicle body. This battery unit has four beam members that are provided on a lower surface of the battery case and fixed to the left and right side members by bolt fastening, and a front-side support member that is provided at a front end of the battery case and fixed to a cross member by bolt fastening. This battery case houses a plurality of battery modules. Each battery module is formed by connecting a plurality of cells in series.

SUMMARY

In the electric vehicle configured as described above, the large-sized battery unit is mounted in the lower part of the vehicle body, which is preferable in terms of increasing the travel distance per charge that is an important performance index for electric vehicles. However, this electric vehicle has a configuration in which the battery case (casing) is mounted between the left and right side members (vehicle body frame members) and the battery modules (cell stacks) are housed inside this casing. Thus, a mounting clearance provided between the casing and the vehicle body (a clearance for preventing interference between the casing and the vehicle body) and an installation space of walls of the casing form dead spaces in which the cell stacks cannot be mounted. Moreover, for example, when a restraining member provided exclusively for the restraining purpose is used to restrain (retain) the cell stacks onto the casing, an installation space of this restraining member and a tool clearance (a clearance to allow insertion of a tool) also form dead spaces. Thus, in terms of increasing the mounting space of cell stacks, there is room for improvement in the above-described related art.

The present disclosure is a battery mounting structure that can secure a larger mounting space of cell stacks in a lower part of a vehicle body.

An exemplary aspect of the present disclosure is a battery mounting structure for a vehicle. The battery mounting structure includes: a plurality of vehicle body frame members that is arrayed in a vehicle width direction of the vehicle and is part of a lower frame of a vehicle body; and a plurality of cell stacks that each include a plurality of single cells. Each of the cell stacks is configured to be restrained onto the vehicle body by being sandwiched between the vehicle body frame members directly or through another member.

The vehicle body frame members forming part of the lower frame of the vehicle body are arrayed in the vehicle width direction. The cell stacks each include single cells, and are each restrained onto the vehicle body by being sandwiched between the vehicle body frame members directly or through another member. Thus, it is possible to reduce or eliminate a dead space created between the cell stacks and the vehicle body frame members, and thereby to increase the mounting space of the cell stacks in the lower part of the vehicle body.

Another aspect of the present disclosure is a battery mounting structure. The battery mounting structure includes: a plurality of vehicle body frame members that is arrayed in a vehicle width direction of the vehicle and is part of a lower frame of a vehicle body; and a plurality of cell stacks that each include a plurality of single cells. Each of the cell stacks is restrained between the vehicle body frame members without the use of restraining members that restrain the cell stacks onto the vehicle body frame members.

The vehicle body frame members that form part of the lower frame of the vehicle body are arrayed in the vehicle width direction. The cell stacks each include single cells, and are each restrained between the vehicle body frame members without the use of restraining members provided exclusively for the restraining purpose (e.g., brackets, fasteners, etc.). Thus, it is possible to reduce or eliminate a dead space created between the cell stacks and the vehicle body frame members, and thereby to increase the mounting space of the cell stacks in the lower part of the vehicle body.

Another aspect of the present disclosure is a battery mounting structure. The battery mounting structure includes: a plurality of vehicle body frame members that is arrayed in a vehicle width direction of the vehicle and is part of a lower frame of a vehicle body; and a plurality of cell stacks that each include a plurality of single cells. Each of the cell stacks is mounted between the vehicle body frame members in a state of being exposed to a space between the vehicle body frame members.

The vehicle body frame members that form part of the lower frame of the vehicle body are arrayed in the vehicle width direction. The cell stacks each include the single cells, and are each mounted between the vehicle body frame members in a state of being exposed to the space between the vehicle body frame members, i.e., in a state of not being housed in a casing that forms an outer shell. Thus, it is possible to reduce or eliminate a dead space created between the cell stacks and the vehicle body frame members, and thereby to increase the mounting space of the cell stacks in the lower part of the vehicle body.

The single cells may be stacked in an array direction of the vehicle body frame members.

The single cells may be stacked in the array direction of the vehicle body frame members. Thus, for example, when the cell stack expands in a stacking direction of the single cells, this expansion can be restricted by the vehicle body frame members located on both sides of this cell stack in the staking direction.

The vehicle body frame members may include: a pair of rockers that is disposed at an equal distance from a center of a width of the vehicle and extends in a vehicle front-rear direction; a floorpan that is disposed on an upper side of the rockers in a vehicle-height direction and extends in the vehicle width direction, the floorpan being a floor surface of a vehicle cabin; and a bottom plate that is disposed on a lower side of the rockers in the vehicle-height direction and extends in the vehicle width direction, the bottom plate being a lower surface of the vehicle body. The cell stacks may be covered by the rockers, the floorpan, and the bottom plate from both sides in the vehicle-height direction and both sides in the vehicle width direction.

The vehicle body frame members may include: a pair of rockers that is disposed at an equal distance from a center of a width of the vehicle and extends in a vehicle front-rear direction; a floorpan that is disposed on an upper side of the rockers in a vehicle-height direction and extends in the vehicle width direction, the floorpan being a floor surface of a vehicle cabin; and a bottom plate that is disposed on a lower side of the rockers in the vehicle-height direction and extends in the vehicle width direction, the bottom plate being a lower surface of the vehicle body. The cell stacks may be covered by the rockers, the floorpan, and the bottom plate from both sides in the vehicle-height direction and both sides in the vehicle width direction. Thus, the pair of rockers, the floorpan, and the bottom plate forming part of the vehicle body function as a battery case that houses the cell stacks. Compared with a configuration in which cell stacks are housed in a casing (battery case) that is formed separately from the vehicle body and mounted under a floor of the vehicle cabin, this configuration can reduce or eliminate a dead space created under the floor of the vehicle cabin in the vehicle-height direction. As a result, a low-floor vehicle can be realized.

The battery mounting structure may further include cross members that extend in the vehicle width direction. The vehicle body frame members may extend in a vehicle front-rear direction, and the cross members may be disposed between the vehicle body frame members, and both ends of the cross members may be connected to the vehicle body frame members.

The battery mounting structure may further include cross members that extend in the vehicle width direction. The vehicle body frame members may extend in a vehicle front-rear direction, and the cross members may be disposed between the vehicle body frame members, and both ends of the cross members may be connected to the vehicle body frame members. Thus, it is possible to reduce or prevent damage to the cell stacks in the event of a lateral collision of the vehicle.

The vehicle body frame members may be: a pair of rockers that is disposed at an equal distance from a center of a width of the vehicle and extends in the vehicle front-rear direction; and a center tunnel that passes through the center. The center tunnel may be disposed between the rockers, and may extend in the vehicle front-rear direction.

The vehicle body frame members may be: a pair of rockers that is disposed at an equal distance from a center of a width of the vehicle and extends in the vehicle front-rear direction; and a center tunnel that passes through the center. The center tunnel may be disposed between the rockers, and may extend in the vehicle front-rear direction. Thus, in the event of a lateral collision of the vehicle, the collision load can be transmitted to the center tunnel through the cross member, so that the collision load can be absorbed by deformation of the center tunnel.

The other member may be a plate-shaped spacer.

As has been described above, the battery mounting structure according to the present disclosure can secure a larger mounting space of cell stacks in a lower part of a vehicle body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A battery mounting structure 10 according to an embodiment of the present disclosure will be described using FIG. 1 to FIG. 7. The arrows FR, UP, LH shown as appropriate in the drawings respectively indicate a frontward direction (forward direction), an upward direction, and a leftward direction of a battery-equipped vehicle 12 to which the battery mounting structure 10 according to this embodiment is applied. Unless otherwise specified, front and rear sides, left and right sides, and upper and lower sides used in the following description refer respectively to front and rear sides in a vehicle front-rear direction, left and right sides in a vehicle horizontal direction (vehicle width direction), and upper and lower sides in a vehicle-height direction. To make the drawings easily viewable, some members and some reference signs may be omitted from the drawings.

Figure 1:
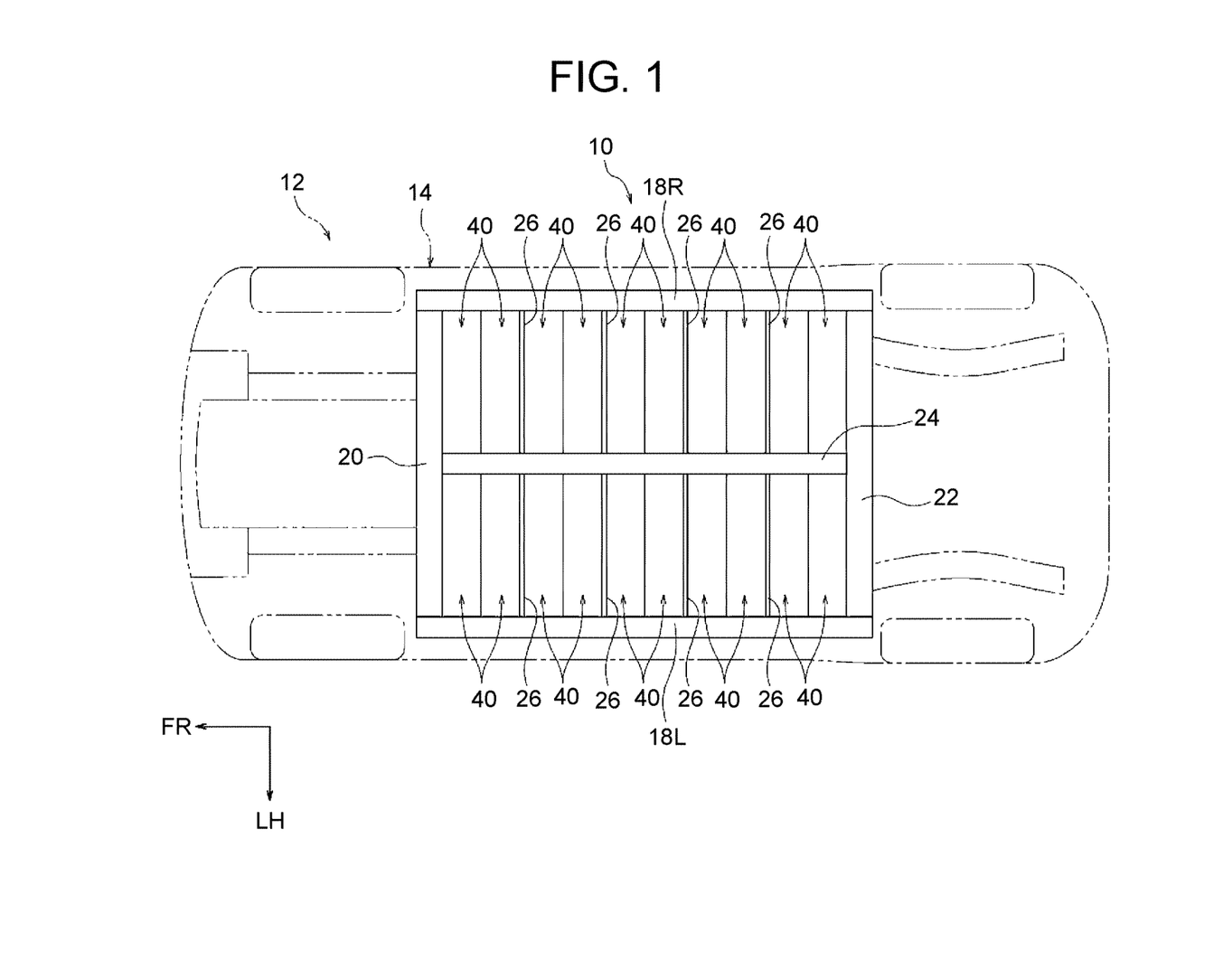
FIG. 1 is a plan view showing the configuration of a lower part of a vehicle body of a battery-equipped vehicle to which a battery mounting structure according to an embodiment of the present disclosure is applied.
Figure 2:
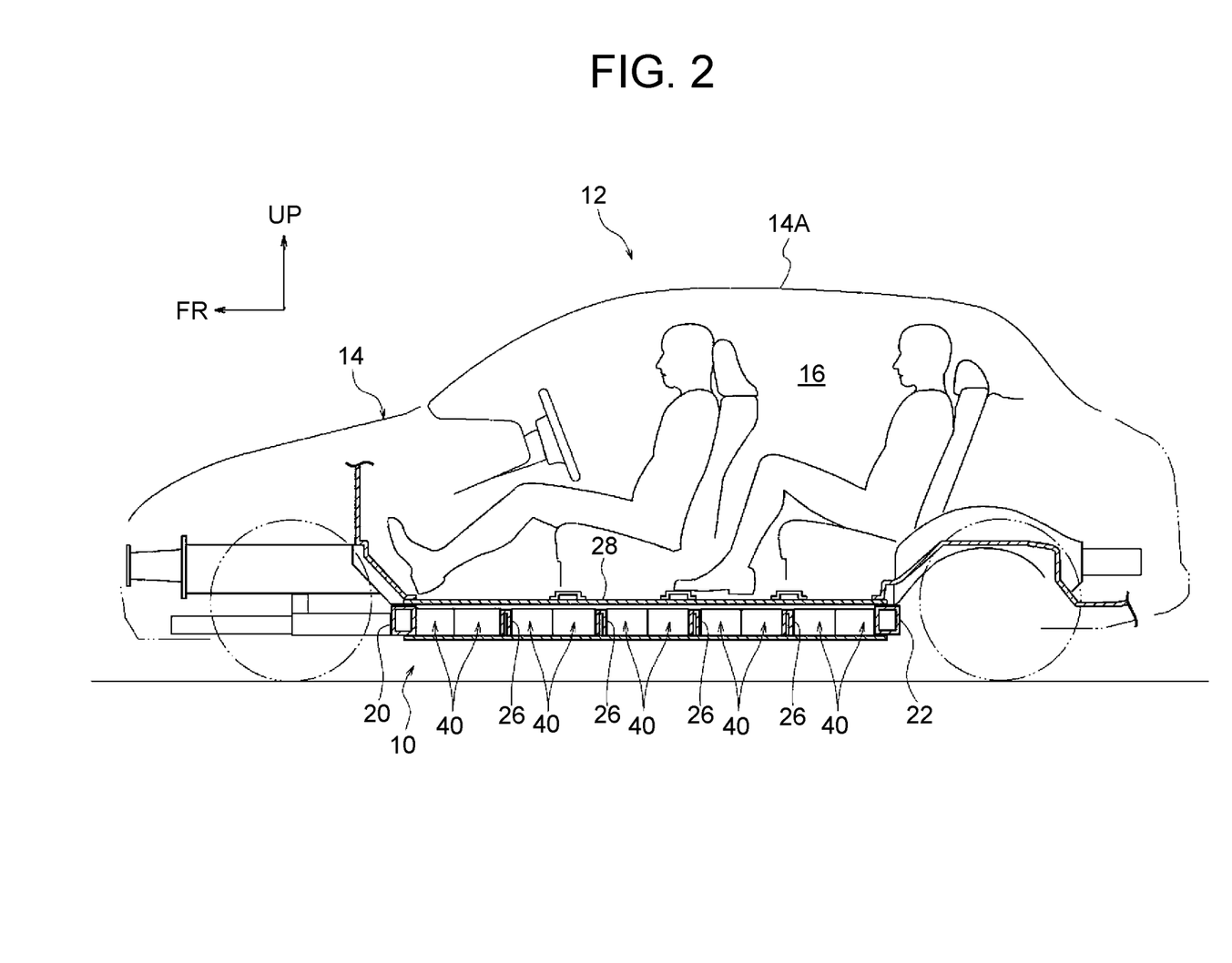
FIG. 2 is a sectional view of the battery-equipped vehicle as seen from a left side of the vehicle.

As shown in FIG. 1 and FIG. 2, the battery-equipped vehicle 12 (hereinafter abbreviated as the "vehicle 12") according to this embodiment is an electric vehicle that travels using driving power from an electric motor (not shown), and includes a sedan-type vehicle body 14. In a lower part of the vehicle body 14, a plurality of (in this example, 20) cell stacks (battery modules) 40 that supplies driving electric power to the electric motor is mounted. In the following, the configuration of the lower part of the vehicle body 14 will be described first, and then the configuration of the cell stacks 40, and the main feature of this embodiment, namely a structure for mounting the cell stacks 40 in the vehicle body 14 will be described.

As shown in FIG. 1 to FIG. 6, the vehicle body 14 includes: a pair of left and right rockers (a pair of rockers) 18L, 18R (see FIG. 1 and FIG. 3 to FIG. 6) that extend in the vehicle front-rear direction respectively below both ends of a vehicle cabin 16 (see FIG. 2 and FIG. 4) in the vehicle width direction; a front cross member 20 (see FIG. 1 to FIG. 3, FIG. 5, and FIG. 6) that is suspended across front ends of the left and right rockers 18L, 18R along the vehicle width direction; and a rear cross member 22 (see FIG. 1 to FIG. 3, FIG. 5, and FIG. 6) that is suspended across rear ends of the left and right rockers 18L, 18R along the vehicle width direction.

The vehicle body 14 further includes a center tunnel 24 (see FIG. 1 and FIG. 3 to FIG. 6) that extends in the vehicle front-rear direction at a center part of the vehicle body 14 in the vehicle width direction between the left and right rockers 18L, 18R, and that is suspended across the front cross member 20 and the rear cross member 22. The vehicle body 14 further includes a plurality of (in this example, eight) intermediate cross members 26 (see FIG. 1 to FIG. 3, FIG. 5, and FIG. 6) that is arrayed in the vehicle front-rear direction between the left and right rockers 18L, 18R and the center tunnel 24, and that is suspended across the left and right rockers 18L, 18R and the center tunnel 24. The vehicle body 14 further includes a floorpan 28 (see FIG. 2 and FIG. 4; not shown in the other drawings) that is suspended across upper parts of the left and right rockers 18L, 18R and forms a floor surface of the vehicle cabin 16, and a bottom plate 30 (see FIG. 2 and FIG. 4 to FIG. 6) that is suspended across lower parts (lower ends) of the left and right rockers 18L, 18R and forms a lower surface of the vehicle body 14.

The rockers 18L, 18R and the center tunnel 24 correspond to the "vehicle body frame members" in the present disclosure, and the intermediate cross members 26 correspond to the "cross member" in the present disclosure. The rockers 18L, 18R and the center tunnel 24 are arrayed in the vehicle horizontal direction (in this example, the vehicle width direction), and form part of a lower frame of the vehicle body 14 along with the front cross member 20, the rear cross member 22, and the intermediate cross members 26.

The left and right rockers 18L, 18R, the front cross member 20, and the rear cross member 22 are manufactured by extrusion of light metal, such as aluminum alloy. Each of the left and right rockers 18L, 18R is formed in an elongated shape with a long side oriented in the vehicle front-rear direction, and has a substantially rectangular cross-sectional shape as seen from the vehicle front-rear direction. Each of the front cross member 20 and the rear cross member 22 is formed in an elongated shape with a long side oriented in the vehicle width direction, and has a substantially rectangular cross-sectional shape as seen from the vehicle width direction. Both ends of the front cross member 20 in a long-side direction thereof are coupled respectively to the front ends of the left and right rockers 18L, 18R, and both ends of the rear cross member 22 in a long-side direction thereof are coupled respectively to the rear ends of the left and right rockers 18L, 18R.

The center tunnel 24 and the intermediate cross members 26 are manufactured by press working of a plate material made of light metal, such as aluminum alloy. The center tunnel 24 is formed in an elongated shape with a long side oriented in the vehicle front-rear direction, and is substantially hat-shaped in cross-section as seen from the vehicle front-rear direction. Both ends of the center tunnel 24 in a long-side direction thereof are coupled respectively to the front cross member 20 and the rear cross member 22.

The intermediate cross member 26 is formed in an elongated shape with a long side oriented in the vehicle width direction, and is substantially hat-shaped in cross-section as seen from the vehicle width direction. Four intermediate cross members 26 are installed between the left rocker 18L and the center tunnel 24 and between the right rocker 18R and the center tunnel 24. The four intermediate cross members 26 on each of the left and right sides, the front cross member 20, and the rear cross member 22 are arrayed at regular intervals in the vehicle front-rear direction. The positions of the four intermediate cross members 26 located on the left side of the vehicle and the positions of the four intermediate cross members 26 located on the right side of the vehicle coincide with each other in the vehicle front-rear direction. Both ends in a long-side direction of each of the four intermediate cross members 26 located on the left side of the vehicle are coupled respectively to the left rocker and the center tunnel 24, while both ends in the long-side direction of each of the four intermediate cross members 26 located on the right side of the vehicle are coupled respectively to the right rocker and the center tunnel 24.

The floorpan 28 and the bottom plate 30 are manufactured by press working of a plate material made of light metal, such as aluminum alloy, and have a plate shape with a plate thickness direction oriented in the vehicle-height direction. Left and right edges of the floorpan 28 are in contact with steps formed on upper sides of the left and right rockers 18L, 18R, from the upper side in the vehicle-height direction, while front and rear edges of the floorpan 28 are in contact with upper surfaces of the front cross member 20 and the rear cross member 22 from the upper side in the vehicle-height direction. Left and right edges of the bottom plate 30 are in contact with lower surfaces of the left and right rockers 18L, 18R from the lower side in the vehicle-height direction, while front and rear edges of the bottom plate 30 are in contact with lower surfaces of the front cross member 20 and the rear cross member 22 from the lower side in the vehicle-height direction. The floorpan 28 and the bottom plate 30 are coupled to the left and right rockers 18L, 18R, the front cross member 20, and the rear cross member 22, and the bottom plate 30 is coupled also to the center tunnel 24.

The above-described configuration of the lower part of the vehicle body 14 is merely an example and can be changed as appropriate. In the case where the members composing the lower part of the vehicle body 14 are made of the same type of light metal (e.g., aluminum alloy) as in this embodiment, means such as spot welding, friction stir welding, riveting, or bolt fastening can be used as the method of coupling together these members. In the case where the members to be coupled together are made of different types of material (e.g., steel and an aluminum alloy), means such as bolt fastening or riveting can be used as the coupling method.

The left and right rockers 18L, 18R, the front cross member 20, the rear cross member 22, the floorpan 28, and the bottom plate 30 form a case that houses a plurality of cell stacks 40. Specifically, in this embodiment, a closed space (battery housing room) is formed under a floor of the vehicle cabin 16 by the left and right rockers 18L, 18R, the front cross member 20, the rear cross member 22, the floorpan 28, and the bottom plate 30, and the cell stacks 40 are housed in this closed space. The cell stacks 40 are covered by the left and right rockers 18L, 18R from both sides in the vehicle horizontal direction, covered by the floorpan 28 and the bottom plate 30 from both sides in the vehicle-height direction, and covered by the front cross member 20 and the rear cross member 22 from both sides in the vehicle front-rear direction. A junction box, a switch box, a control unit, etc. (not shown) are housed at a rear end side of the closed space.

Figure 6:
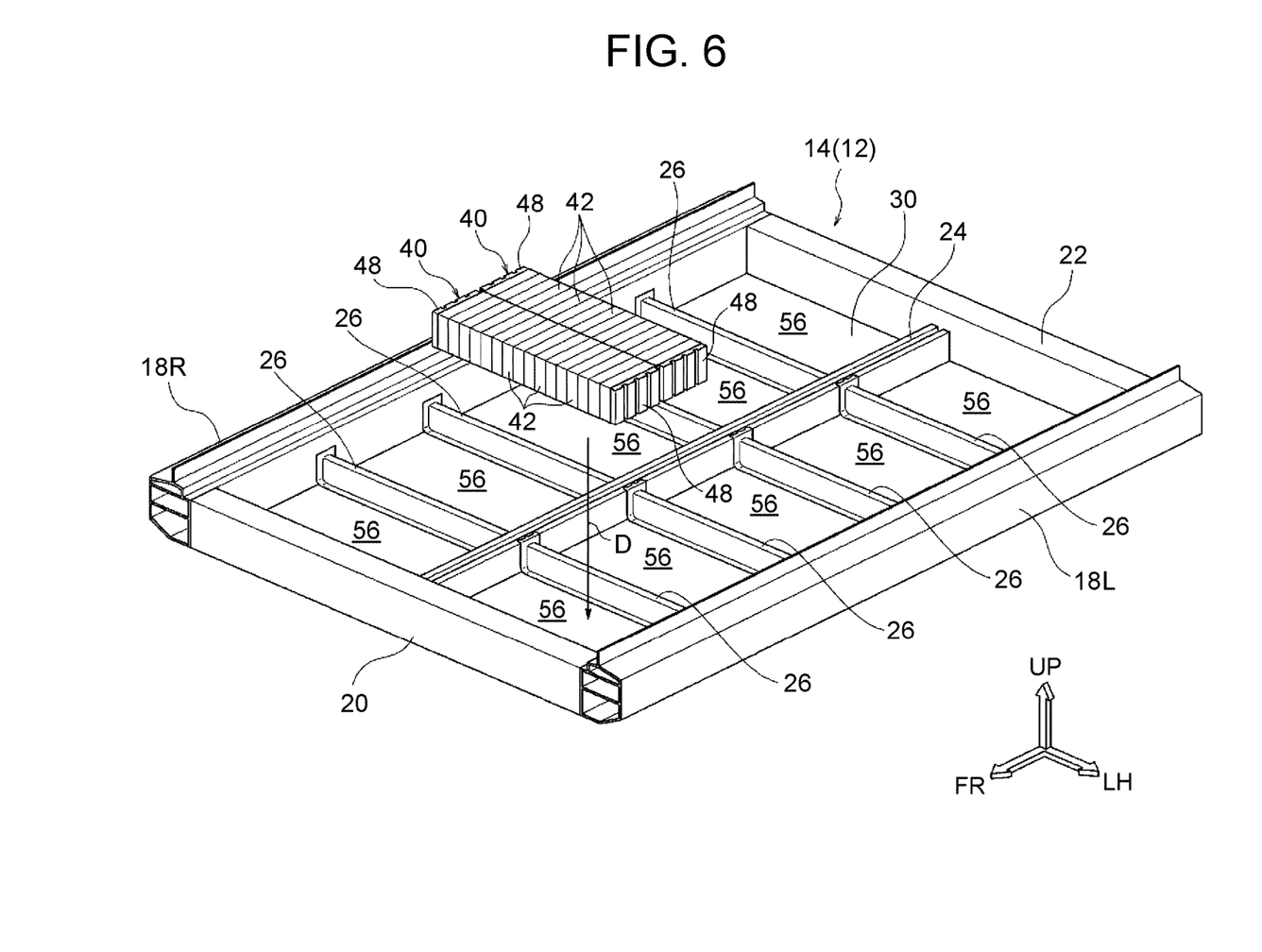
FIG. 6 is a perspective view corresponding to FIG. 5, illustrating a cell stack mounting method.
Figure 7:
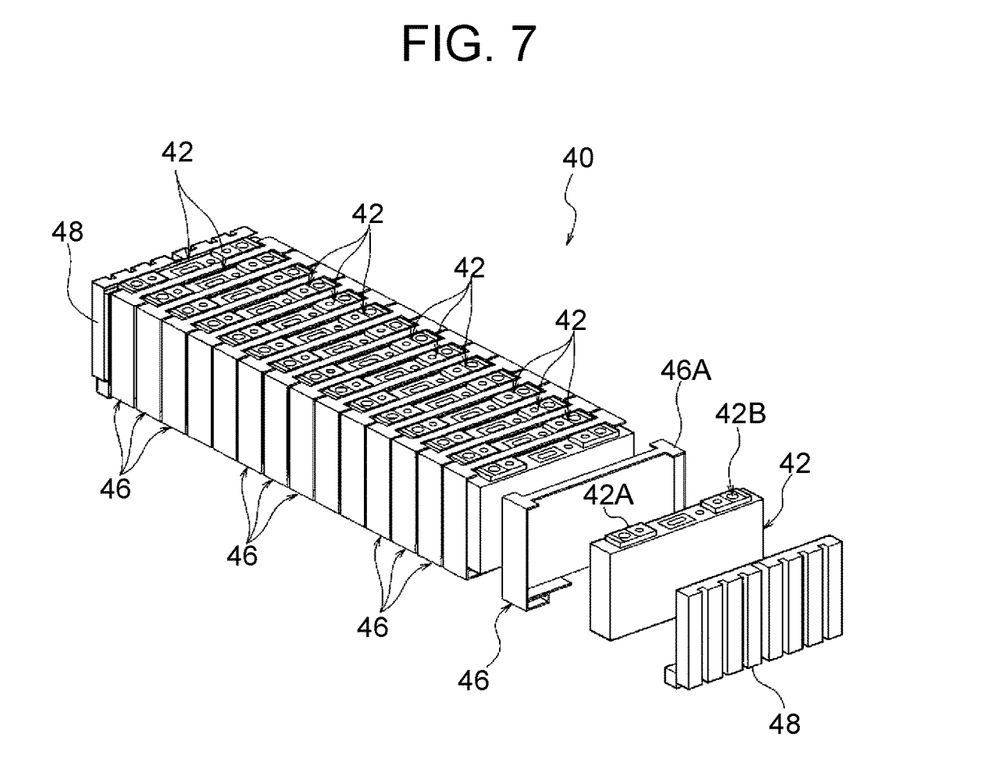
FIG. 7 is an exploded perspective view showing the cell stack in a partially exploded state.

As shown in FIG. 7, the cell stack 40 is mainly composed of a plurality of stacked single cells (accumulators) 42, and for example, the single cells 42 are electrically connected in series to form a module. In FIG. 1 to FIG. 3 and FIG. 6, the cell stacks 40 are schematically depicted. A stacking direction of the single cells 42 is the vehicle width direction in which the left and right rockers 18L, 18R and the center tunnel 24 are arrayed (face each other). For example, the single cell 42 is a lithium-ion secondary battery, and is a rectangular battery having a flat rectangular parallelepiped case. A positive electrode terminal 42A and a negative electrode terminal 42B are provided on an upper surface of each single cell 42. The single cell 42 is not limited to a lithium-ion secondary battery, and may instead be another type of battery, such as a nickel-hydrogen secondary battery.

An insulator 46 is sandwiched between adjacent ones of the stacked single cells 42, so that the single cells 42 and the insulators 46 are stacked alternately. For example, the insulator 46 is molded from a resin, and has a substantially rectangular shape with a thickness direction oriented in the stacking direction. A frame part 46A protruding toward both sides in the stacking direction so as to form a frame is provided at an outer peripheral edge of the insulator 46, and the single cell 42 is fitted inside the frame part 46A.

One single cell 42 is located at each end of a stack that is formed by stacking the single cells 42 and the insulators 46 as described above, and an end plate 48 is placed on each of the single cells 42 at both ends, from an outer side in the stacking direction. For example, the end plate 48 is molded from a resin, and has a substantially rectangular shape with a thickness direction oriented in the stacking direction.

The cell stack 40 configured as described above has an elongated rectangular parallelepiped shape as a whole, with a long side oriented in the vehicle width direction. In the cell stack 40, the positive electrode terminals 42A and the negative electrode terminals 42B of the adjacent single cells 42 are connected to each other through a bus bar (not shown) that is an electrically conductive member. However, the configuration of the cell stack 40 is not limited to this example and can be changed as appropriate. For example, the end plates 48 may be omitted. Next, the main feature of this embodiment will be described.

Figure 3:
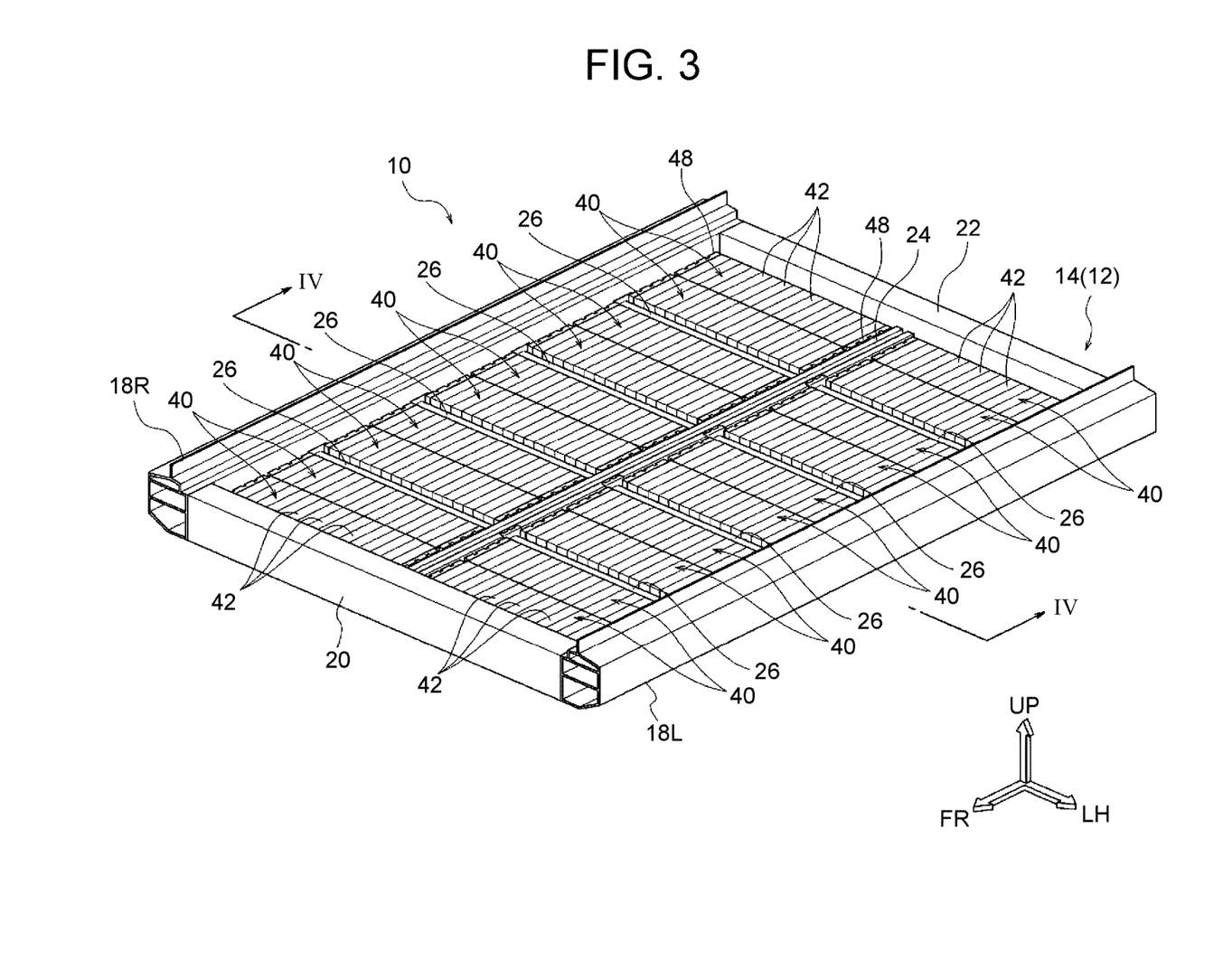
FIG. 3 is a perspective view showing a portion of the lower part of the vehicle body shown in FIG. 1.
Figure 4:
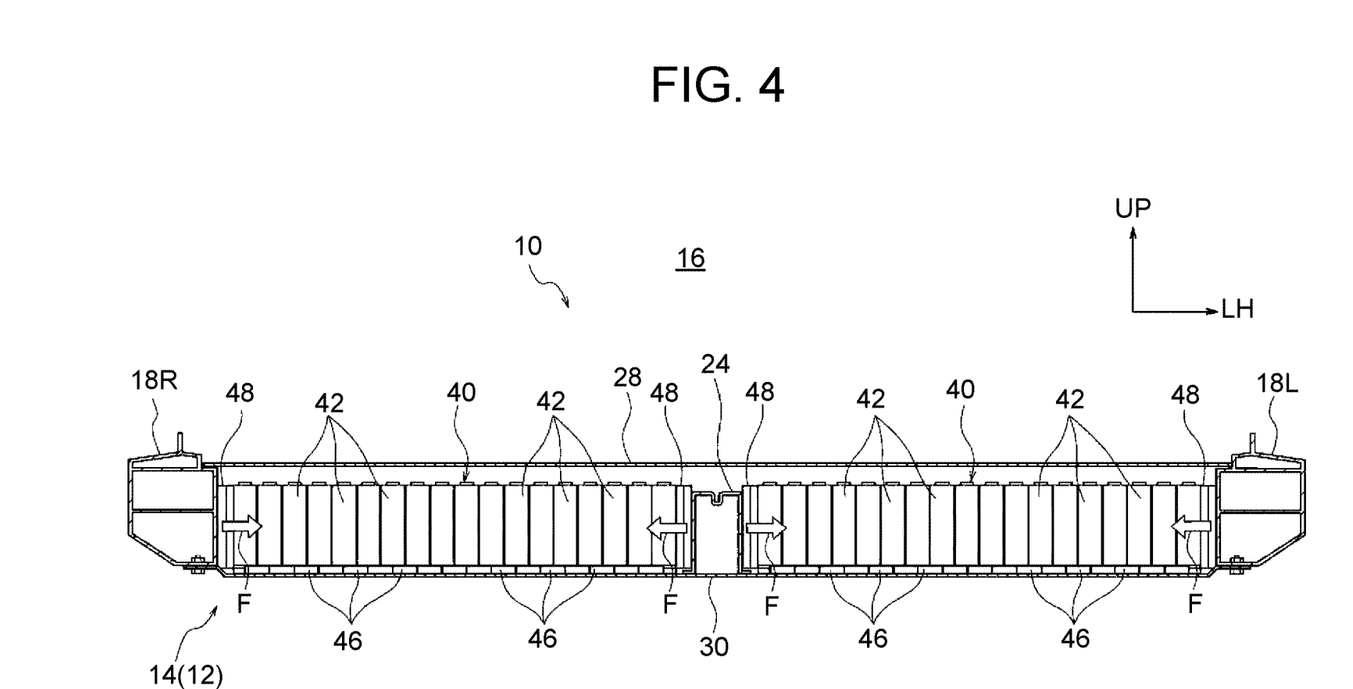
FIG. 4 is an enlarged sectional view showing a section taken along line IV-IV in FIG. 3.
Figure 5:
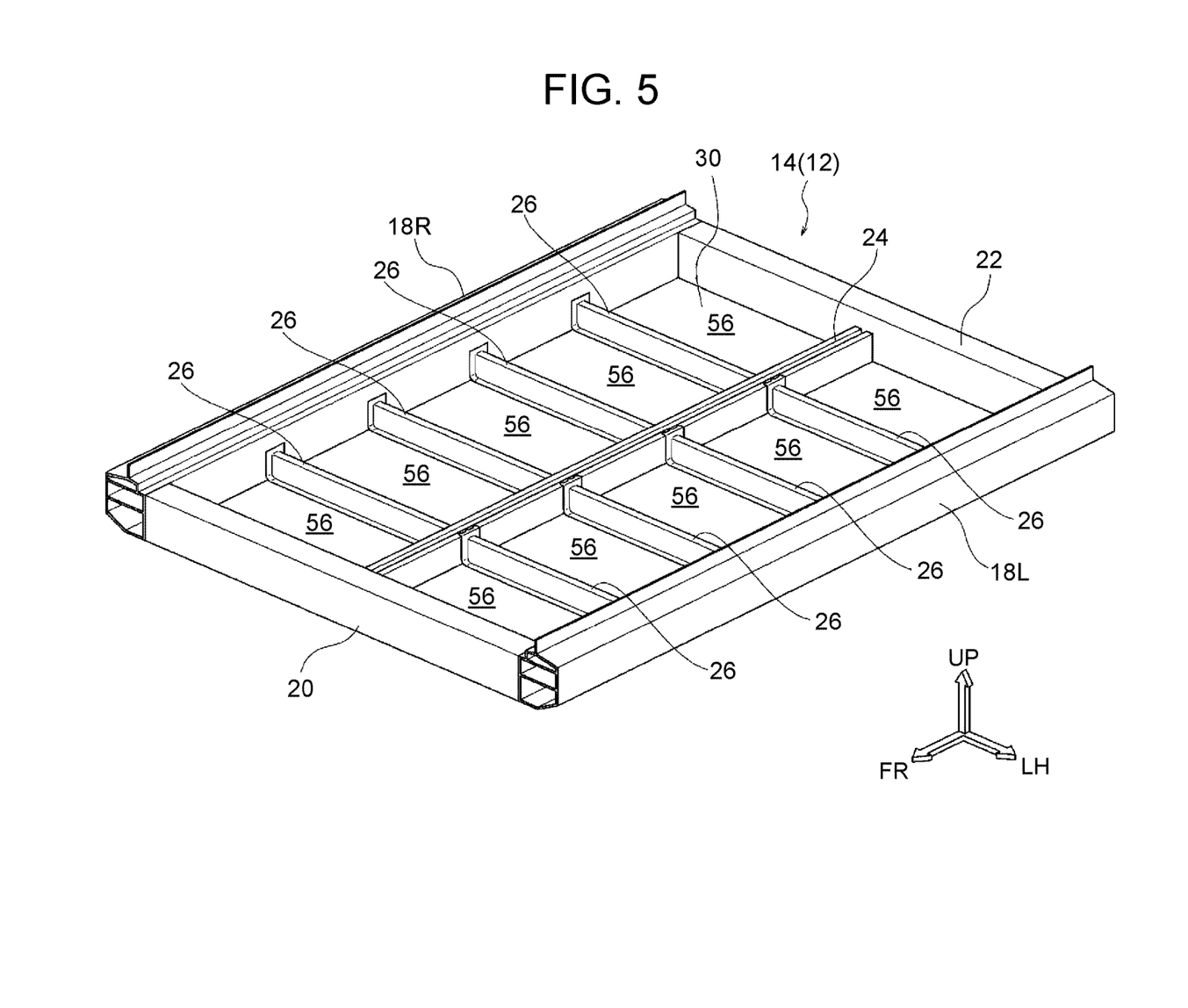
FIG. 5 is a perspective view of the portion shown in FIG. 3, with cell stacks omitted.

In this embodiment, as shown in FIG. 1, FIG. 3, and FIG. 4, the plurality of (in this embodiment, 10) cell stacks 40 is mounted (disposed) so as to be arrayed in the vehicle front-rear direction, between the left rocker 18L and the center tunnel 24 and between the right rocker 18R and the center tunnel 24. Specifically, five small spaces 56 (reference sign 56 is omitted from the drawings other than FIG. 5 and FIG. 6) that are separated from each other in the vehicle front-rear direction by the four intermediate cross members 26 are formed between the left rocker 18L and the center tunnel 24 and between the right rocker 18R and the center tunnel 24. Inside each small space 56, two cell stacks 40 are disposed (housed) side by side in the vehicle front-rear direction. In the following description, the left rocker 18L and the right rocker 18R may be referred to simply as the rockers 18.

Each cell stack 40 is restrained (retained) onto the vehicle body 14 by being directly sandwiched between the rocker 18 and the center tunnel 24. Specifically, each cell stack 40 is restrained onto the vehicle body 14 as the pair of end plates 48 thereof that is provided respectively at both ends in the array direction of the rockers 18 and the center tunnel 24 (i.e., at both ends of the cell stack 40 in a long-side direction thereof) comes in contact with the rocker 18 and the center tunnel 24. "Being sandwiched" here means that "the cell stack 40 is pressed from both sides (in the array direction) so as not to be movable", while "being restrained" means that, at least during normal driving of the vehicle 12, displacement of the cell stack 40 relative to the vehicle body 14 in the length, horizontal, and vertical directions is restricted. In this embodiment, both ends of each cell stack 40 in the long-side direction are directly in contact with the rocker 18 and the center tunnel 24, but the present disclosure is not limited to this example. For example, both ends of each cell stack 40 in the long-side direction may be in contact with the rocker 18 and the center tunnel 24 through a plate-shaped spacer etc., i.e., each cell stack 40 may be sandwiched between the rocker 18 and the center tunnel 24 through another member.

As shown in FIG. 4, each cell stack 40 that is sandwiched between the rocker 18 and the center tunnel 24 (has both ends thereof in the long-side direction in contact with the rocker 18 and the center tunnel 24) as described above is subjected to a restraining force (sandwiching force; compressive force) F from the rocker 18 and the center tunnel 24 in the vehicle width direction (the stacking direction of the single cells 42). Thus, displacement of each cell stack 40 relative to the vehicle body 14 in the length direction, the horizontal direction, and the height direction is restricted. In this embodiment, therefore, even when the bottom plate 30 and the intermediate cross members 26 are removed from the vehicle body 14, each cell stack 40 is kept in a state of being restrained (retained) onto the vehicle body 14.

In this embodiment, the cell stacks 40 are restrained between the left and right rockers 18L, 18R and the center tunnel 24 without the use of restraining members that are provided exclusively for the restraining purpose (e.g., brackets, fasteners, etc.). Moreover, the cell stacks 40 are each mounted between the rocker 18 and the center tunnel 24 in a state of being exposed to the space between the rocker 18 and the center tunnel 24, i.e., in a state of not being housed in a casing (battery case) that forms an outer shell. Thus, in this embodiment, the cell stacks 40 are mounted over substantially the entire area under the floor of the vehicle cabin 16. The front cross member 20, the rear cross member 22, and the intermediate cross members 26 are in contact with the cell stacks 40 or closely face the cell stacks 40.

In this embodiment, each cell stack 40 is mounted (inserted) between the rocker 18 and the center tunnel 24 from the upper side in the vehicle-height direction (see the arrow D in FIG. 6). For example, as shown in FIG. 6, the cell stacks 40 are mounted after the bottom plate 30 is attached to the lower frame of the vehicle body 14 but before the floorpan 28 is attached. To insert the cell stack 40 between the rocker 18 and the center tunnel 24, for example, the cell stack 40 is compressed by a jig (not shown) in the vehicle width direction (the stacking direction of the single cells 42).

Next, the workings and effects of this embodiment will be described.

In the battery mounting structure 10 configured as described above, the cell stacks 40 each including the single cells 42 are disposed between the left and right rockers 18L, 18R and the center tunnel 24 that are arrayed in the vehicle width direction and form part of the lower frame of the vehicle body 14. Each cell stack 40 is sandwiched between one of the left and right rockers 18L, 18R and the center tunnel 24, with both ends thereof in the array direction of the left and right rockers 18L, 18R and the center tunnel 24 respectively in contact with that one of the left and right rockers 18L, 18R and with the center tunnel 24. With the cell stacks 40 thus restrained onto the vehicle body 14, it is possible to avoid creating a dead space between the cell stacks 40 and each of the left and right rockers 18L, 18R and the center tunnel 24. As a result, a larger mounting space of the cell stacks 40 can be secured in the lower part of the vehicle body 14.

Thus, in this embodiment, the cell stacks 40 are restrained between the left and right rockers 18L, 18R and the center tunnel 24 without the use of restraining members provided exclusively for the restraining purpose (e.g., brackets, fasteners, etc.), so that an installation space of the restraining members, a tool clearance, etc. are not required. Moreover, in this embodiment, the cell stacks 40 are mounted between the left and right rockers 18L, 18R and the center tunnel 24 in a state of being exposed to the space between the rockers 18 and the center tunnel 24, i.e., in a state of not being housed in a casing (battery case) that forms an outer shell, so that a mounting clearance for the battery case, an installation space of walls of the battery case, etc. are not required. It is therefore possible to pack a larger number of single cells 42 in the lower part of the vehicle body 14 (in this example, under the floor of the vehicle cabin 16), and thereby to increase the capacity of the cells (amount of energy stored therein) that can be mounted under the floor of the vehicle cabin 16.

Figure 8:
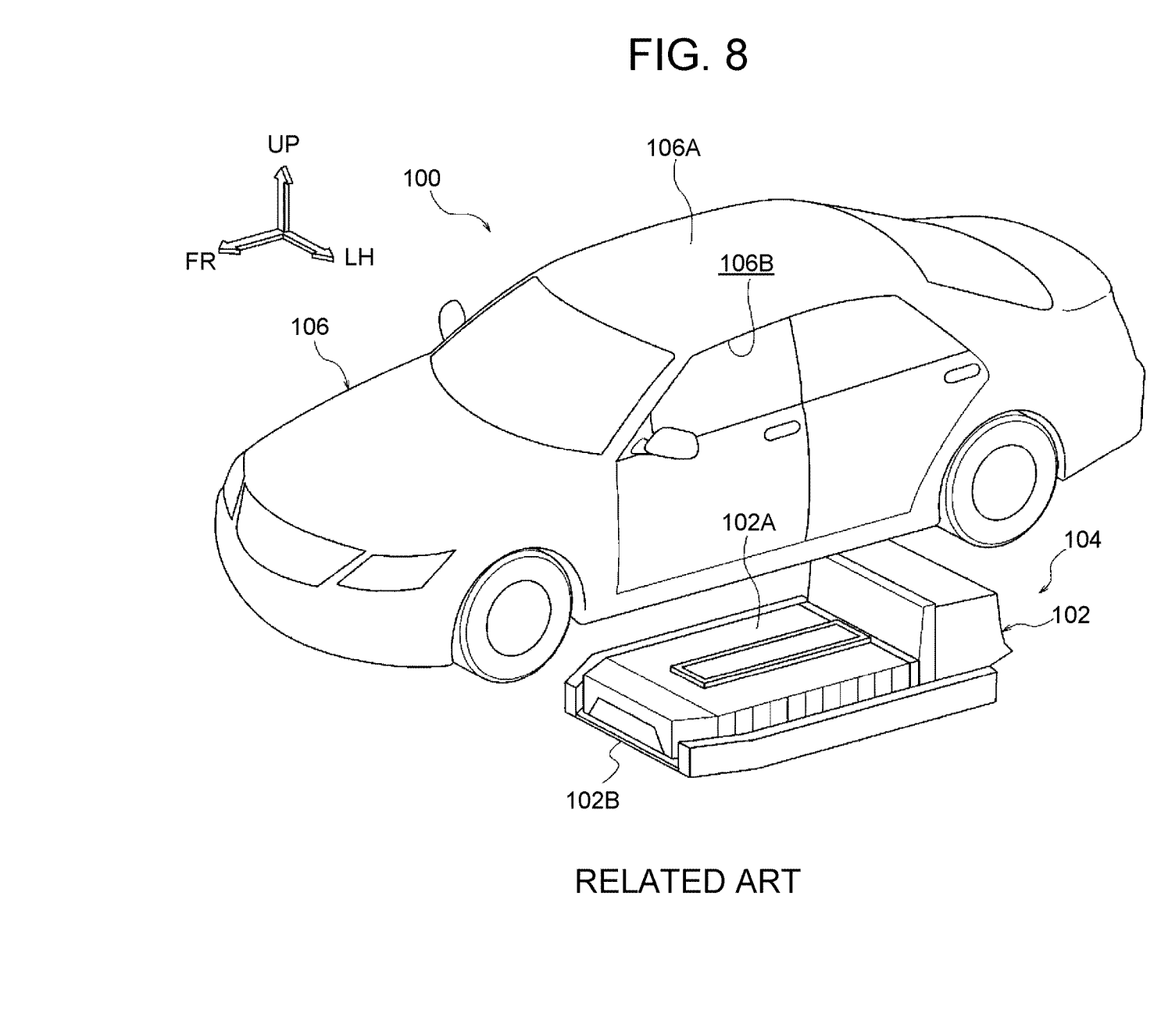
FIG. 8 is a perspective view showing a battery-equipped vehicle according to a comparative example.

In the following, the workings and effects of this embodiment will be described in detail using a battery-equipped vehicle 100 (comparative example) shown in FIG. 8. The battery-equipped vehicle 100 according to this comparative example (hereinafter may be referred to as the "comparative example 100") is an electric vehicle, for example, and is configured such that a large-sized battery pack 104 including a battery case 102 is mounted in a lower part of a vehicle body 106 (under a floor of a vehicle cabin). The battery pack 104 is formed separately from the vehicle body 106, and is attached to the vehicle body 106.

Figure 9:
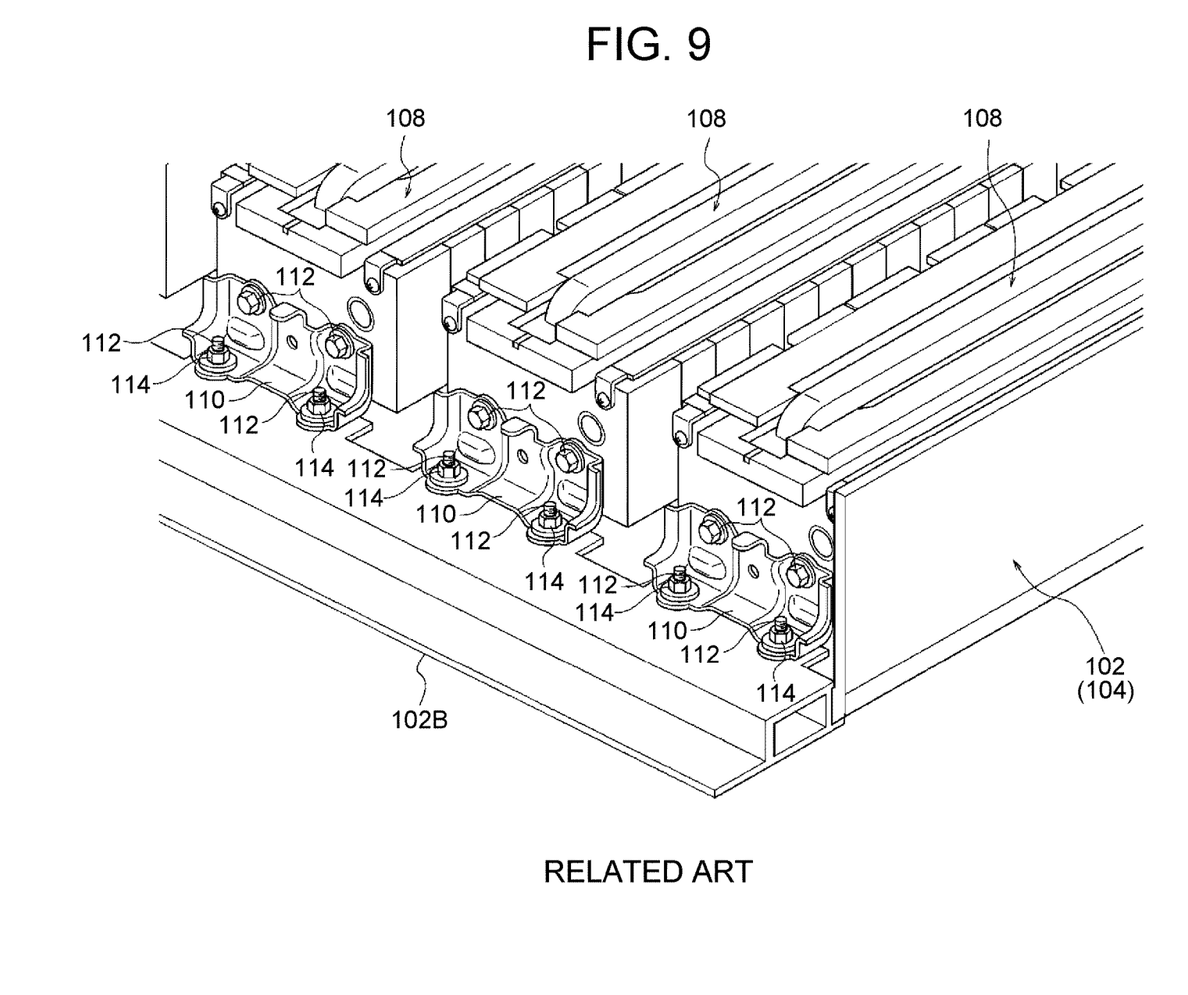
FIG. 9 is a perspective view showing a portion of a battery pack according to the comparative example.

In the comparative example 100, a dead space is created due to a mounting clearance for allowing the battery pack 104 to be mounted in the vehicle body 106, a tool clearance, etc. Moreover, in the comparative example 100, as shown in FIG. 9, a plurality of cell stacks 108 housed in the battery case 102 is restrained (fixed) onto the battery case 102 by means of brackets 110, bolts 112, nuts 114, etc. that are restraining members provided exclusively for the restraining purpose. Thus, an installation space of the brackets 110 and the like, a tool clearance, etc. provided inside the battery case 102 also form dead spaces. As a result, the amount of energy that can be stored under the floor of the vehicle cabin is reduced, while the mass and the manufacturing cost of the battery-equipped vehicle 100 increase due to the mass and the manufacturing cost of the battery case 102.

In the embodiment, by contrast, the lower frame of the vehicle body 14 (underbody frame) is used as the restraining member of the cell stacks 40, so that a mounting clearance, a tool clearance, etc. required in the comparative example 100 are not required, and a larger space is made available for mounting the cell stacks 40 (single cells 42). Accordingly, the number (filling rate) of the single cells 42 mounted under the floor of the vehicle cabin 16 can be increased, and thereby the travel distance per charge, which is an important performance index for electric vehicles, can be significantly increased compared with that of the comparative example 100. Moreover, the battery case 102 required in the comparative example 100 is not required, so that the mass and the manufacturing cost of the vehicle 12 can be reduced.

In the comparative example 100, a dead space is created also in the vehicle-height direction due to a mounting clearance provided between a top wall 102A of the battery case 102 and a floorpan (not shown) of the vehicle body 106, an installation space of the top wall 102A, etc. Accordingly, the installation level of the floorpan of the vehicle body 106 is high, and so are the hip point of an occupant and the installation level of a roof 106A of the vehicle body 106. As a result, not only is the design of the vehicle body 106 constrained, but also the coefficient of drag (CD value) of the vehicle body 106 increases and the electric power efficiency decreases. In the case where the comparative example 100 is a hybrid electric vehicle, the fuel efficiency decreases.

In the embodiment, by contrast, the cell stacks 40 are covered from both sides in the vehicle-height direction by the floorpan 28 that is suspended across the upper parts of the left and right rockers 18L, 18R and forms the floor surface of the vehicle cabin 16 and by the bottom plate 30 that is suspended across the lower parts of the left and right rockers 18L, 18R and forms the lower surface of the vehicle body 14. This means that, in this embodiment, the left and right rockers 18L, 18R, the floorpan 28, and the bottom plate 30 forming part of the vehicle body 14 function as a battery case that houses the cell stacks 40. Compared with a configuration in which the battery case 102 separate from the vehicle body 106 is mounted under the floor of the vehicle cabin as in the comparative example 100, this configuration can reduce or eliminate a dead space created in the vehicle-height direction under the floor of the vehicle cabin 16. As a result, a low-floor vehicle 12 can be realized, which allows greater flexibility in designing the vehicle body 14. Moreover, it is possible to lower the hip point of an occupant and lower the installation level of a roof 14A (see FIG. 2), and thereby to improve the CD value of the vehicle body 14. As a result, the electric power efficiency (or the fuel efficiency, in the case where the vehicle 12 is a hybrid electric vehicle) can be improved.

In the comparative example 100, the cell stacks 108, which are heavy objects, are supported by a bottom plate 102B of the battery case 102. Thus, it is necessary to secure the sufficient strength and rigidity of the bottom plate 102B, which causes an increase in the mass and the manufacturing cost of the bottom plate 102B. This contrasts with the embodiment, in which the bottom plate 30 is not intended to support the cell stacks 40 but required merely to seal the space under the floor where the cell stacks 40 are housed, and therefore a lightweight and less costly bottom plate 30 can be adopted.

In the comparative example 100, it is necessary to design the strength of the vehicle body 14 based on anti-collision requirements and the strength of the battery pack 104 based on the requirements of regulations, which means double strength designing and hence redundant designing. This contrasts with the embodiment, in which the lower frame of the vehicle body 14 is used as the restraining member of the cell stacks 40, and therefore the strength designing is easier without the need for such double strength designing. For example, in the case where the same platform is shared among a plurality of different vehicle models, it suffices to design the mounting structure of the cell stacks 40 on a platform-by-platform basis, which also makes designing easier. Moreover, as the mounting positions of the cell stacks 40 are fixed for each platform, the number of types of peripheral parts can be reduced.

In the comparative example 100, one cannot mount the heavy and large-sized battery pack 104 onto the vehicle body 106 by passing the battery pack 104 through a door opening 106B of the vehicle body 106. Thus, another problem is the low efficiency of the mounting work due to the necessity of mounting the battery pack 104 onto the vehicle body 106 from the lower side as shown in FIG. 8. In the embodiment, by contrast, the cell stacks 40 can be mounted onto the lower part of the vehicle body 14 from the upper side as shown in FIG. 6, which can increase the efficiency of the mounting work.

In the embodiment, the cell stacks 40 located between the left and right rockers 18L, 18R and the center tunnel 24 each include the single cells 42 that are stacked in the array direction of the left and right rockers 18L, 18R and the center tunnel 24. Thus, when the cell stack 40 expands in the stacking direction of the single cells 42, this expansion can be restricted by the rocker 18 and the center tunnel 24 located on both sides of the cell stack 40 in the stacking direction.

In the embodiment, the cell stacks 40 are disposed between the left and right rockers 18L, 18R and the center tunnel 24, and the intermediate cross members 26 extending in the vehicle width direction are suspended across the left and right rockers 18L, 18R and the center tunnel 24. Thus, damage to the cell stacks 40 in the event of a lateral collision of the vehicle 12 can be reduced or prevented by the intermediate cross members 26. Moreover, in the event of a lateral collision of the vehicle 12, the collision load can be transmitted through the intermediate cross member 26 to the center tunnel 24, so that the collision load can be absorbed by deformation of the center tunnel 24.

Figure 10:
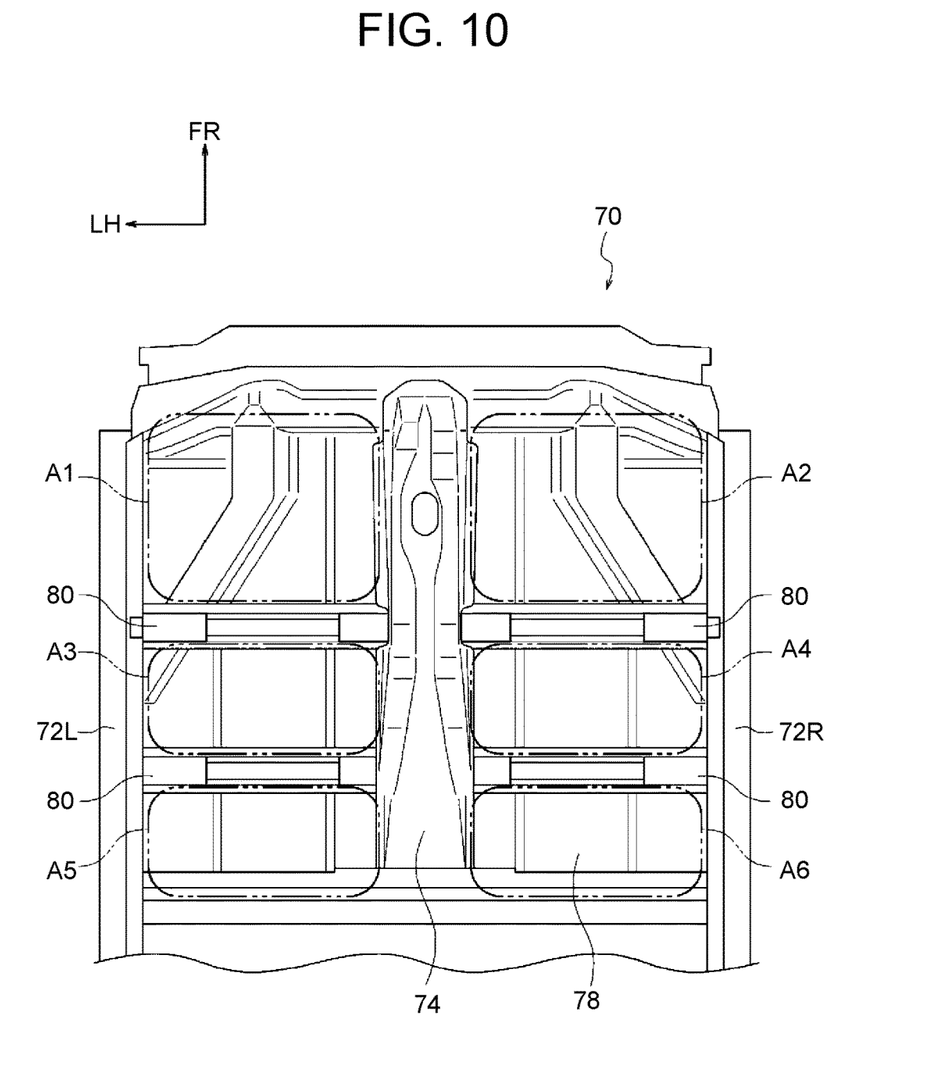
FIG. 10 is a plan view showing an example of a lower part of a vehicle body to which the battery mounting structure according to the present disclosure is applicable.

In the embodiment, the case where the present disclosure is applied to the vehicle 12 that is a sedan-type electric vehicle has been described. Without being limited to this example, the present disclosure is also applicable to a vehicle other than a sedan-type vehicle or to a hybrid electric vehicle etc. For example, FIG. 10 shows a portion of a vehicle body 70 of a hybrid electric vehicle. The battery mounting structure according to the present disclosure is also applicable to the vehicle body 70. Specifically, in the vehicle body 70, too, a plurality of cell stacks (not shown in FIG. 10) can be directly mounted between left and right rockers 72L, 72R and a center tunnel 74 (see the regions A1 to A6 enclosed by two-dot dashed lines in FIG. 10), and these cell stacks can be restrained by the left and right rockers 72L, 72R and the center tunnel 74. As a result, a small, lightweight, and less costly hybrid electric vehicle can be realized. In FIG. 10, reference sign 78 denotes a floorpan, and reference signs 80 denote cross members.

In the embodiment, the case where the left and right rockers 18L, 18R and the center tunnel 24 constitute the "vehicle body frame members" according to the present disclosure has been described. Without being limited to this example, the present disclosure is also applicable to a vehicle that does not include the center tunnel 24. In this case, for example, a plurality of cell stacks is restrained onto a vehicle body by being sandwiched between left and right rockers. Alternatively, left and right side members that are disposed side by side in the vehicle width direction may constitute the "vehicle body frame members" according to the present disclosure, or a plurality of cross members arrayed in the vehicle front-rear direction may constitute the "vehicle body frame members" according to the present disclosure.

In the embodiment, the front cross member 20 and the rear cross member 22 are suspended respectively across the front ends and the rear ends of the left and right rockers 18L, 18R. However, the present disclosure is not limited to this example, and the front cross member 20 and the rear cross member 22 may be omitted. In this case, for example, a front end and a rear end of an underfloor space (battery housing room) formed between the floorpan 28 and the bottom plate 30 are closed with plate-shaped closure members.

In the embodiment, the intermediate cross members 26 (cross members) are suspended across the left and right rockers 18L, 18R and the center tunnel 24. However, the present disclosuren is not limited to this example, and the intermediate cross members 26 may be omitted. In a vehicle that does not include a center tunnel, cross members may be suspended across left and right rockers.

In the embodiment, the cell stacks 40 are covered from both sides in the vehicle-height direction by the floorpan 28 that forms the floor surface of the vehicle cabin 16 and by the bottom plate 30 that forms the lower surface of the vehicle body 14. However, the present disclosure is not limited to this example. For example, another plate-shaped member may be interposed between the cell stacks 40 and the floorpan 28 or between the cell stacks 40 and the bottom plate 30.

In the embodiment, the single cells 42 are stacked in the array direction of the left and right rockers 18L, 18R and the center tunnel 24 (vehicle body frame members). However, the present disclosure is not limited to this example. The array direction of the vehicle body frame members (the direction in which the vehicle body frame members face each other) and the stacking direction of the single cells may be different from each other. Also in this case, it is preferable that the array direction of the vehicle body frame members and the expansion direction of the cell stack coincide with each other.

In the embodiment, the cell stacks 40 are restrained between the left and right rockers 18L, 18R and the center tunnel 24 without the use of restraining members provided exclusively for the restraining purpose. However, the present disclosure is not limited to this example. That is, the cell stacks may be restrained onto the vehicle body by means of restraining members provided exclusively for the restraining purpose (brackets, fasteners, etc.). In this case, for example, the cell stacks may be fixed to the left and right rockers and the center tunnel, or may be fixed to the bottom plate, by means of these restraining members.

In addition, the present disclosure can be implemented with various changes made thereto within the scope of the gist of the disclosure. It should be understood that the scope of right of the present disclosure is not limited to the above embodiment.

What is claimed is:

1. A battery mounting structure for a vehicle, the battery mounting structure comprising:
    a plurality of vehicle body frame members that is arrayed in a vehicle width direction of the vehicle and is part of a lower frame of a vehicle body; and
    a plurality of cell stacks that each include a plurality of single cells, each of the cell stacks is sandwiched between the vehicle body frame members such that the vehicle body frame members press on both sides of each of the cell stacks, in a stacking direction of the cell stacks, that prevents displacement of the cell stacks with respect to the vehicle body frame members.

2. The battery mounting structure according to claim 1, wherein the single cells are stacked in an array direction of the vehicle body frame members.

3. The battery mounting structure according to claim 1, wherein the vehicle body frame members include:
    a pair of rockers that is disposed at an equal distance from a center of a width of the vehicle and extends in a vehicle front-rear direction;
    a floorpan that is disposed on an upper side of the rockers in a vehicle-height direction and extends in the vehicle width direction, the floorpan being a floor surface of a vehicle cabin; and
    a bottom plate that is disposed on a lower side of the rockers in the vehicle-height direction and extends in the vehicle width direction, the bottom plate being a lower surface of the vehicle body, and wherein the cell stacks are covered by the rockers, the floorpan, and the bottom plate from both sides in the vehicle-height direction and both sides in the vehicle width direction.

4. The battery mounting structure according to claim 1, further comprising cross members that extend in the vehicle width direction,
   wherein the vehicle body frame members extend in a vehicle front-rear direction, and
   the cross members are disposed between the vehicle body frame members, and both ends of the cross members are connected to the vehicle body frame members.

5. The battery mounting structure according to claim 4, wherein the vehicle body frame members are:
   a pair of rockers that is disposed at an equal distance from a center of a width of the vehicle and extends in the vehicle front-rear direction; and
   a center tunnel that passes through the center, the center tunnel is disposed between the rockers, and extends in the vehicle front-rear direction.

6. The battery mounting structure according to claim 1, wherein the other member is a plate-shaped spacer.

7. A battery mounting structure for a vehicle, the battery mounting structure comprising:
   a plurality of vehicle body frame members that is arrayed in a vehicle width direction of the vehicle and is part of a lower frame of a vehicle body; and
   a plurality of cell stacks that each include a plurality of single cells, each of the cell stacks is sandwiched between the vehicle body frame members such that the vehicle body frame members press on both sides of each of the cell stacks, in a stacking direction of the cell stacks, that prevents displacement of the cell stacks with respect to the vehicle body frame members without the use of restraining members.

8. The battery mounting structure according to claim 7, wherein the single cells are stacked in an array direction of the vehicle body frame members.

9. The battery mounting structure according to claim 7, wherein the vehicle body frame members include:
   a pair of rockers that is disposed at an equal distance from a center of a width of the vehicle and extends in a vehicle front-rear direction;
   a floorpan that is disposed on an upper side of the rockers in a vehicle-height direction and extends in the vehicle width direction, the floorpan being a floor surface of a vehicle cabin; and
   a bottom plate that is disposed on a lower side of the rockers in the vehicle-height direction and extends in the vehicle width direction, the bottom plate being a lower surface of the vehicle body, and
   wherein the cell stacks are covered by the rockers, the floorpan, and the bottom plate from both sides in the vehicle-height direction and both sides in the vehicle width direction.

10. The battery mounting structure according to claim 7, further comprising cross members that extend in the vehicle width direction,
    wherein the vehicle body frame members extend in a vehicle front-rear direction, and
    the cross members are disposed between the vehicle body frame members, and both ends of the cross members are connected to the vehicle body frame members.

11. The battery mounting structure according to claim 10, wherein the vehicle body frame members are:
    a pair of rockers that is disposed at an equal distance from a center of a width of the vehicle and extends in the vehicle front-rear direction; and
    a center tunnel that passes through the center, the center tunnel is disposed between the rockers, and extends in the vehicle front-rear direction.

12. A battery mounting structure for a vehicle, the battery mounting structure comprising:
    a plurality of vehicle body frame members that is arrayed in a vehicle width direction of the vehicle and is part of a lower frame of a vehicle body; and
    a plurality of cell stacks that each include a plurality of single cells, each of the cell stacks is sandwiched between the vehicle body frame members in a state of being exposed to a space between the vehicle body frame members, such that the vehicle body frame members press on both sides of each of the cell stacks, in a stacking direction of the cell stacks, that prevents displacement of the cell stacks with respect to the vehicle body frame members.

13. The battery mounting structure according to claim 12, wherein the single cells are stacked in an array direction of the vehicle body frame members.

14. The battery mounting structure according to claim 12, wherein the vehicle body frame members include:
    a pair of rockers that is disposed at an equal distance from a center of a width of the vehicle and extends in a vehicle front-rear direction;
    a floorpan that is disposed on an upper side of the rockers in a vehicle-height direction and extends in the vehicle width direction, the floorpan being a floor surface of a vehicle cabin; and
    a bottom plate that is disposed on a lower side of the rockers in the vehicle-height direction and extends in the vehicle width direction, the bottom plate being a lower surface of the vehicle body, and
    wherein the cell stacks are covered by the rockers, the floorpan, and the bottom plate from both sides in the vehicle-height direction and both sides in the vehicle width direction.

15. The battery mounting structure according to claim 12, further comprising cross members that extend in the vehicle width direction,
    wherein the vehicle body frame members extend in a vehicle front-rear direction, and
    the cross members are disposed between the vehicle body frame members, and both ends of the cross members are connected to the vehicle body frame members.

16. The battery mounting structure according to claim 15, wherein the vehicle body frame members are:
    a pair of rockers that is disposed at an equal distance from a center of a width of the vehicle and extends in the vehicle front-rear direction; and
    a center tunnel that passes through the center, the center tunnel is disposed between the rockers, and extends in the vehicle front-rear direction.

* * * * *